United States Patent
Guo et al.

(10) Patent No.: US 10,264,244 B2
(45) Date of Patent: Apr. 16, 2019

(54) DISPLAY PANEL AND A DISPLAY DRIVING METHOD THEREOF, A DISPLAY DRIVING DEVICE AND A DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Renwei Guo, Beijing (CN); Xue Dong, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 170 days.

(21) Appl. No.: 15/501,756
(22) PCT Filed: Oct. 27, 2015
(86) PCT No.: PCT/CN2015/092971
  § 371 (c)(1),
  (2) Date: Feb. 3, 2017
(87) PCT Pub. No.: WO2016/197522
  PCT Pub. Date: Dec. 15, 2016

(65) Prior Publication Data
  US 2017/0230643 A1    Aug. 10, 2017

(30) Foreign Application Priority Data
  Jun. 8, 2015 (CN) .......................... 2015 1 0309573

(51) Int. Cl.
  *G09G 3/00* (2006.01)
  *G09G 3/20* (2006.01)
  (Continued)

(52) U.S. Cl.
  CPC ............. *H04N 13/32* (2018.05); *G09G 3/003* (2013.01); *G09G 3/2003* (2013.01);
  (Continued)

(58) Field of Classification Search
  CPC .... H04N 13/32; H04N 13/324; G09G 3/2003; G09G 2300/0443; G09G 2360/16
  See application file for complete search history.

(56) References Cited

U.S. PATENT DOCUMENTS

2003/0067460 A1    4/2003    Tomono
2005/0041174 A1    2/2005    Numata et al.
(Continued)

FOREIGN PATENT DOCUMENTS

CN    101588514 A    11/2009
CN    101626517 A    1/2010
(Continued)

OTHER PUBLICATIONS

Written Opinion of the International Searching Authority from corresponding PCT Application No. PCT/CN2015/092971, dated Feb. 24, 2016 (4 pages).
(Continued)

*Primary Examiner* — Priyank J Shah
(74) *Attorney, Agent, or Firm* — Harness, Dickey & Pierce, P.L.C.

(57) ABSTRACT

Exemplary embodiments of the present invention provide a display panel and a display driving method thereof, a display driving device and a display device. The display panel comprises a pixel array and a grating array blocking in the light outgoing direction of the pixel array, wherein the pixel array is periodically arranged in order of a first color sub-pixel column, a second color sub-pixel column and a third color sub-pixel column, each sub-pixel column comprising a plurality of rectangular sub-pixels; and the pixel array comprises four view pixel groups for displaying four views.

13 Claims, 10 Drawing Sheets

(51) Int. Cl.
*H04N 13/324* (2018.01)
*H04N 13/32* (2018.01)

(52) U.S. Cl.
CPC ... *H04N 13/324* (2018.05); *G09G 2300/0443* (2013.01); *G09G 2360/16* (2013.01)

(56) References Cited

U.S. PATENT DOCUMENTS

| | | | |
|---|---|---|---|
| 2011/0007390 A1* | 1/2011 | Yanamoto | G02B 27/2214 359/466 |
| 2011/0234929 A1* | 9/2011 | Lin | G02B 27/2214 349/15 |
| 2012/0007899 A1* | 1/2012 | Kuijpers | G09G 3/003 345/690 |
| 2013/0127840 A1* | 5/2013 | Tsuzaki | G06T 15/00 345/419 |
| 2014/0063001 A1* | 3/2014 | Kim | G02B 27/2264 345/419 |
| 2015/0309319 A1* | 10/2015 | Wei | G02B 27/2214 359/463 |
| 2016/0379533 A1 | 12/2016 | Guo et al. | |
| 2017/0039911 A1 | 2/2017 | Guo et al. | |

FOREIGN PATENT DOCUMENTS

| | | |
|---|---|---|
| CN | 102238410 A | 11/2011 |
| CN | 102630027 A | 8/2012 |
| CN | 103792607 A | 5/2014 |
| CN | 104599626 A | 5/2015 |
| CN | 104680949 A | 6/2015 |
| CN | 104835445 A | 8/2015 |
| JP | 2005284044 A | 10/2005 |
| WO | WO-2014033699 A2 | 3/2014 |

OTHER PUBLICATIONS

Office Action from corresponding Chinese Application No. 201510309573.7, dated Dec. 16, 2016 (6 pages).

* cited by examiner

| | S1 | S2 | S3 | S4 | S5 | S6 | S7 | S8 | S9 | S10 | S11 | S12 | S13 | S14 | S15 | S16 | S17 | S18 | S19 | S20 | S21 | S22 | S23 | S24 |
|---|---|---|---|---|---|---|---|---|---|---|---|---|---|---|---|---|---|---|---|---|---|---|---|---|
| | R | G | B | R | G | B | R | G | B | R | G | B | R | G | B | R | G | B | R | G | B | R | G | B |
| R1 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| R2 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 |
| R3 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 |
| R4 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 |
| R5 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 |
| R6 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 | 3 |
| R7 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 | 2 |
| R8 | 2 | 3 | 4 | 1 | 2 | 3 | 4 | 1 | 2 | 3 | 4 | 1 | 2 | 3 | 4 | 1 | 2 | 3 | 4 | 1 | 2 | 3 | 4 | 1 |

DISPLAY PANEL AND A DISPLAY DRIVING METHOD THEREOF, A DISPLAY DRIVING DEVICE AND A DISPLAY DEVICE

CROSS-REFERENCE TO RELATED APPLICATION

This application claims the benefit and priority of Chinese Patent Application No. 201510309573.7, filed on Jun. 8, 2015, the entire content of which is incorporated by reference herein.

FIELD OF THE DISCLOSURE

Embodiments of the present invention relate to a display panel and a display driving method thereof, a display driving device and a display device.

BACKGROUND

Naked-eye 3D display is a display technology that does not require auxiliary equipment (such as wearing red and blue, polarized, shutter glasses or LCD helmet, etc.), and it is widely used in aerospace, military, medical, advertising design and entertainment interactive fields. There are two mainstream technologies of naked-eye 3D display: slit grating and lenticular grating. Slit grating is composed of light-transmitting and light-blocking gratings, to realize the spatial separation of different viewpoint images by blocking the light, while cylindrical lens grating uses the refraction of the light by the cylindrical lens, to deflect the light in space, thereby achieving similar effects with the slit grating, and the both approaches belong to spatial multiplexing naked-eye 3D display technologies. The slit grating is widely used because of its low cost, easy production, good three-dimensional display effect and the like.

Figure 1:
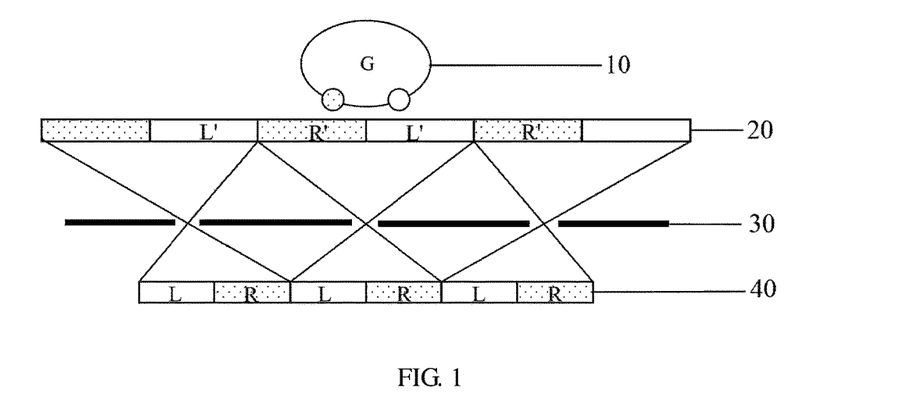
FIGS. 1 and 2 are schematic structural views of a naked-eye 3D display panel in the prior art.
Figure 2:
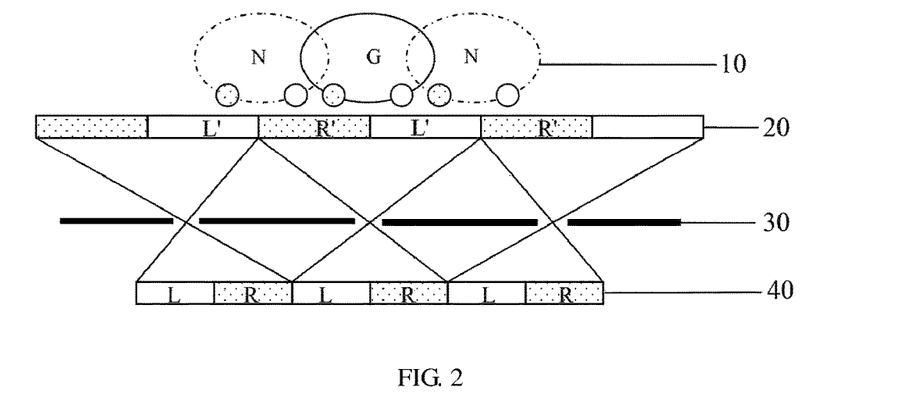

FIG. 1 shows a structure of a conventional naked-eye 3D display panel comprising a pixel array 40 and a grating portion 30 disposed in the light outgoing direction of the pixel array 40, in front of grating portion 30 is a viewing region 20, and a viewer 10 is in front of the viewing region 20 to view 3D pictures. The viewing region 20 comprises left-eye picture viewing regions L' and right-eye picture viewing regions R' which are alternately arranged. When the viewer's left-eye falls on a left-eye picture viewing region L' and his right-eye falls on a right-eye picture viewing region R', the viewer can see a normal 3D picture. However, when the viewer's position is shifted such that his left-eye falls on a right-eye picture viewing region R' and his right-eye falls on a left-eye picture viewing region L', the viewer cannot see a normal 3D picture, while this region is called a "dead zone". As shown in FIG. 2, the G region in FIG. 2 is a region where a normal 3D picture can be seen, and the N regions on both sides of the G region are "dead zones". As can be seen from FIG. 2, when the left-eye picture+the right-eye picture are used, 50% of the areas are "dead zones", greatly reducing the quality of the naked-eye 3D display.

BRIEF SUMMARY OF THE DISCLOSURE

The solution according to exemplary embodiments of the present invention can reduce the "dead zones" at the time of viewing the grating-type naked-eye 3D display panel and improve the quality of the naked-eye 3D display.

According to some embodiments of the present invention, there is provided a display panel comprising:

a pixel array and a grating array arranged in the light outgoing direction of the pixel array, wherein the pixel array is periodically arranged in order of a first color sub-pixel column, a second color sub-pixel column and a third color sub-pixel column, each sub-pixel column comprises a plurality of rectangular sub-pixels; the pixel array comprises a first view pixel group for displaying a first view, a second view pixel group for displaying a second view, a third view pixel group for displaying a third view, and a fourth view pixel group for displaying a fourth view; wherein, for any positive integer M and any integers X and Y equal to or greater than zero, it is satisfied that the sub-pixel at the (M+4X)th Row and the (M+4Y)th Column belongs to the first view pixel group, the sub-pixel at the (M+1+4X)th Row and the (M+4Y)th Column belongs to the fourth view pixel group, the sub-pixel at the (M+2+4X)th Row and the (M+4Y)th Column belongs to the third view pixel group, and the sub-pixel at the (M+3+4X)th Row and the (M+4Y)th Column belongs to the second view pixel group.

Further, the grating array is arranged in the light outgoing direction of odd-row sub-pixels or even-row sub-pixels.

Further, the grating array is arranged in the light outgoing direction of odd-group sub-pixels or even-group sub-pixels, and each group of sub-pixels comprises four columns of adjacent sub-pixels.

Further, each of the light blocking strips of the grating array is a parallelogram, the projection of short sides of the parallelogram on the pixel array is in the row direction and occupies four columns of adjacent sub-pixels, and the projection of long sides thereof on the pixel array diagonally bisects the sub-pixels in one of the first view pixel group to the fourth view pixel group.

According to some embodiments of the present invention, there is provided a display driving method for driving the display panel, comprising:

dividing each view of the first view, the second view, the third view and the fourth view to be displayed into a plurality of theoretical pixel units and determining color components of a plurality of rectangular sub-pixels in each of the theoretical pixel units;

determining, for each rectangular sub-pixel, the luminous brightness of the rectangular sub-pixel according to color components of color of the rectangular sub-pixel covered by a rectangular sampling region corresponding to the rectangular sub-pixel and belonging to the respective theoretical pixel units of the corresponding view;

wherein, a first vertex of a rectangular sampling region of a rectangular sub-pixel is located at a first side of a first end vertex of a first side of the rectangular sub-pixel, and the distance between the first vertex and the first end vertex of the first side of the rectangular sub-pixel is four times the width of the rectangular sub-pixel in the row direction; a second vertex is located on an extended line of a diagonal line from the first end vertex of the first side of the rectangular sub-pixel to a second end vertex of a second side, and the distance between the second vertex and the midpoint of the diagonal line is 3/2 times the length of the diagonal line; the third vertex and the first vertex are symmetrical with respect to the midpoint of the diagonal line, the fourth vertex and the second vertex are symmetrical with respect to the midpoint of the diagonal line; wherein the number of columns is gradually increased along the direction from the first side to the second side, and the number of rows is gradually increased along the direction from the first end to the second end.

Further, determining, for each rectangular sub-pixel, the luminous brightness of the rectangular sub-pixel according to color components of color of the rectangular sub-pixel covered by a rectangular sampling region corresponding to the rectangular sub-pixel and belonging to the respective theoretical pixel units of the corresponding view, comprises:

determining, for each rectangular sub-pixel, an overlapping area of its corresponding rectangular sampling region with each theoretical pixel unit and a color component corresponding to the color of the rectangular sub-pixel in the theoretical pixel unit;

determining, the product of the overlapping area corresponding to each theoretical pixel unit and the corresponding color component;

determining the luminous brightness of the rectangular sub-pixel according to the ratio of the sum of the respective obtained products to the area of the rectangular sub-pixel.

According to some embodiments of the present invention, there is provided a display driving device for driving the display panel, the display driving device comprising:

a pixel dividing unit for dividing each of the first view, the second view, the third view and the fourth view to be displayed into a plurality of theoretical pixel units and determining color component of a plurality of rectangular sub-pixels in each of the theoretical pixel units;

a brightness determination unit for determining, for each rectangular sub-pixel, the luminous brightness of the rectangular sub-pixel according to color components of color of the rectangular sub-pixel covered by a rectangular sampling region corresponding to the rectangular sub-pixel and belonging to the respective theoretical pixel units of the corresponding view;

wherein a first vertex of a rectangular sampling region of a rectangular sub-pixel is located at a first side of a first end vertex of a first side of the rectangular sub-pixel, and the distance between the first vertex and the first end vertex of the first side of the rectangular sub-pixel is four times the width of the rectangular sub-pixel in the row direction; a second vertex is located on an extended line of a diagonal line from the first end vertex of the first side of the rectangular sub-pixel to a second end vertex of a second side, and the distance between the second vertex and the midpoint of the diagonal line is 3/2 times the length of the diagonal line; the third vertex and the first vertex are symmetrical with respect to the midpoint of the diagonal line, the fourth vertex and the second vertex are symmetrical with respect to the midpoint of the diagonal line; wherein the number of columns is gradually increased along the direction from the first side to the second side, and the number of rows is gradually increased along the direction from the first end to the second end.

Further, the brightness determination unit is specifically used for determining, for each rectangular sub-pixel, an overlapping area of its corresponding rectangular sampling region with each theoretical pixel unit and a color component corresponding to the color of the rectangular sub-pixel in the theoretical pixel unit;

determining, the product of the overlapping area corresponding to each theoretical pixel unit and the corresponding color component;

determining the luminous brightness of the rectangular sub-pixel according to the ratio of the sum of the respective obtained products to the area of the rectangular sub-pixel.

According to some embodiments of the present invention, there is further provided a display device comprising the display panel and the display driving device.

The display panel provided in the present invention is capable of reducing the dead zones to 25% of the viewing regions and significantly improving the quality of the naked-eye 3D display.

BRIEF DESCRIPTION OF THE DRAWINGS

In order to more clearly illustrate the technical solution of embodiments of the present invention, the drawings of the embodiments will be briefly described below. Apparently, the drawings described below merely relate to some embodiments of the present invention rather than are intended to limit the present invention, in which.

DETAILED DESCRIPTION

In order that objects, technical solutions and advantages of embodiments of the present invention will become clearer, the technical solutions of the embodiments of the present invention will be clearly and completely described below in conjunction with the accompanying drawings in the embodiments of the present invention. Obviously, the described embodiments are merely a part of the embodiments of the present invention, but not all embodiments. Based on the described embodiments of the present invention, all other embodiments obtained by those of ordinary skill in the art without the need for creative work fall within the scope of the present invention.

In the description of the present invention, it should be noted that the orientation or positional relationship indicated by the terms "upper", "lower", "top", "bottom" and the like is merely for describing the present invention and simplifying the description, rather than suggesting or implying that the indicated device or element must be of a particular orientation, be constructed and operated in a particular orientation, whereby it cannot be construed as limiting the present invention.

In addition, in the description of the present invention, "a plurality of" means two or more, unless otherwise specified.

Figure 3:
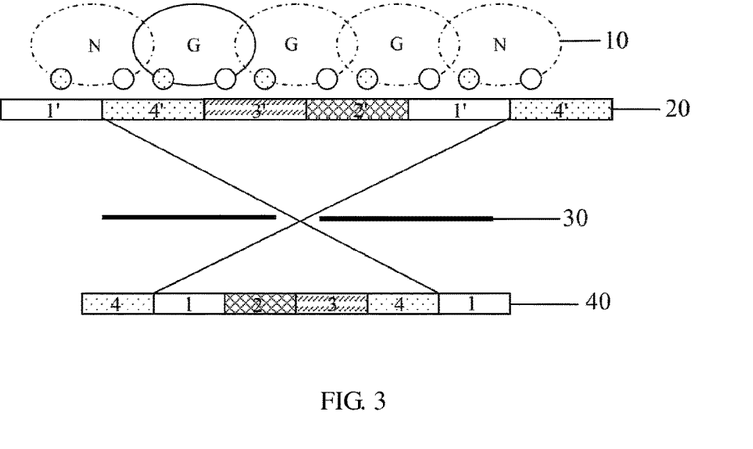
FIG. 3 is a schematic structural view of a display panel provided by an embodiment of the present invention.
Figure 4:
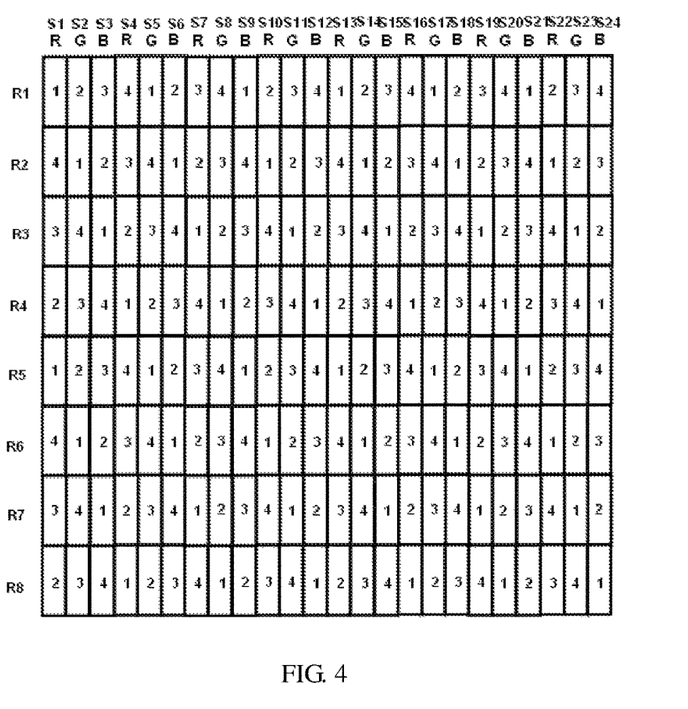
FIG. 4 is a schematic structural view of a pixel array in FIG. 3.

According to a first aspect of the present invention, there is provided a display panel comprising, as shown in FIGS. 3 and 4, a pixel array 40 and a grating array 30 blocking in the light outgoing direction of the pixel array, but different from the prior art, the pixel array 40 comprises four view pixel groups for displaying four kinds of views, respectively. Referring to FIG. 4, for any positive integer M and any integers X and Y equal to or greater than zero, it is satisfied that sub-pixel at the (M+4X)th Row and the (M+4Y)th Column belongs to the first view pixel group 1; the sub-pixel at the (M+1+4X)th Row and the (M+4Y)th Column belongs to the fourth view pixel group 4; the sub-pixel at the (M+2+4X)th Row and the (M+4Y)th Column belongs to the third view pixel group 3; and the Sub-pixel at the (M+3+4X)th Row and the (M+4Y)th Column belongs to the second view pixel group 2. For example, when X and Y are both 0, for any positive integer M having a value of 8 or less, sub-pixels at the Mth Row and the Mth Column (the R1th Row and the S1th Column, the R2th Row and the S2th Column, the R3th Row and the S3th Column, the R4th Row and the S4th Column, the R5th Row and the S5th Column, the r6th Row and the S6th Column, the R7th Row and the S7th Column, the R8th Row and the S8th Column) belong to the first view pixel group 1; sub-pixels at the (M+1)th Row and the Mth Column (the R2th Row and the S1th Column, the R3th Row and the S2th Column, the R4th Row and the S3th Column, the R5th Row and the S4th Column, the R6th Row and the S5th Column, the R7th Row and the S6th Column, the R8th Row and the S7th Column) belong to the fourth view pixel group 4; sub-pixels at the (M+2)th Row and the Mth Column (the R3th Row and the S1th Column, the R4th Row and the S2th Column, the R5th Row and the S3th Column, the R6th Row and the S4th Column, the R7th Row and the S5th Column, the R8th Row and the S6th Column) belong to the third view pixel group 3; and sub-pixels at the (M+3)th Row and The Mth Column (the R4th Row and the S1th Column, the R5th Row and the S2th Column, the R6th Row and the S3th Column, the R7th Row and the S4th Column, the R8th Row and the S5th Column) belong to the second view pixel group 2. When X is 1 and Y is 0, for any positive integer M, sub-pixels at the (M+4)th Row and The Mth Column (the R5th Row and the S1th Column, the R6th Row and the S2th Column, the R7th Row and the S3th Column, the R8th Row and the S4th Column) belong to the first view pixel group 1; sub-pixels at the (M+5)th Row and The Mth Column(the R6th Row and the S1th Column, the R7th Row and the S2th Column, the R8th Row and the S3th Column) belong to the fourth view pixel group 4; sub-pixels at the (M+6)th Row and The Mth Column (the R7th Row and the S1th Column, the R8th Row and the S2th Column) belong to the third view pixel group 3; and sub-pixels at the (M+7)th Row and the Mth Column (the R8th Row and the S1th Column) belong to the second view pixel group 2. It can be seen that the corresponding sub-pixel when X is 1 is lower than the sub-pixel when X is 0 by four columns of sub-pixels, the corresponding sub-pixel when X is 2 is lower than the sub-pixel when X is 1 by four columns of sub-pixels, and accordingly, the corresponding sub-pixel when Y is 1 is shifted right with respect to the corresponding sub-pixel when Y is 0 by four columns of sub-pixels, and the corresponding sub-pixel when Y is 2 is shifted right with respect to the corresponding sub-pixel when Y is 1 by four columns of sub-pixels, and so on, wherein other cases are not listed here.

From FIG. 3, it can be seen that when the four views displayed by the pixel array form a viewing region 20 through the grating 30, if the left and right eyes of the viewer 10 fall within the range of 4'-3 3'-2', 2'-1 viewing regions respectively, a normal 3D effect can be seen, as the G region shown in the figure; and only when the left and right eyes fall within the 1'-4' viewing region, a "dead zone" is created, as the N region shown in the figure. Therefore, the "dead zone" ratio is only 25% of the entire view region.

Figure 5:
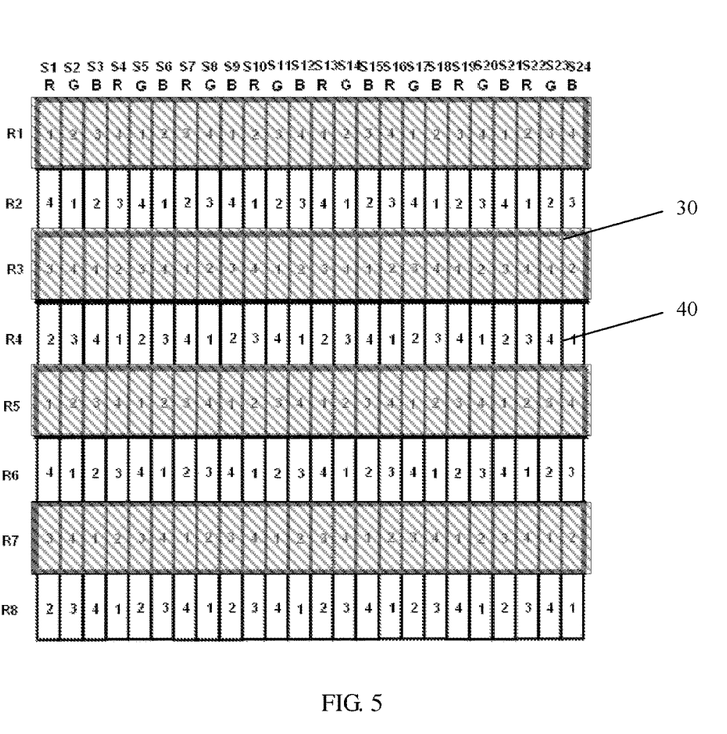
FIG. 5 shows a schematic view of the distribution of the grating array in FIG. 3.

FIG. 5 is a schematic view further showing possible distribution of a grating array, wherein the respective light blocking strips of the grating array are arranged in the light outgoing direction of odd-row (R1, R3, R5, R7) sub-pixels, and each of the light blocking strips blocks one row of odd-row sub-pixels. Of course, in actual application, the respective light blocking strips of the grating array herein may also be arranged in the light outgoing direction of the even-row (R2, R4, R6, R8) sub-pixels.

Figure 6:
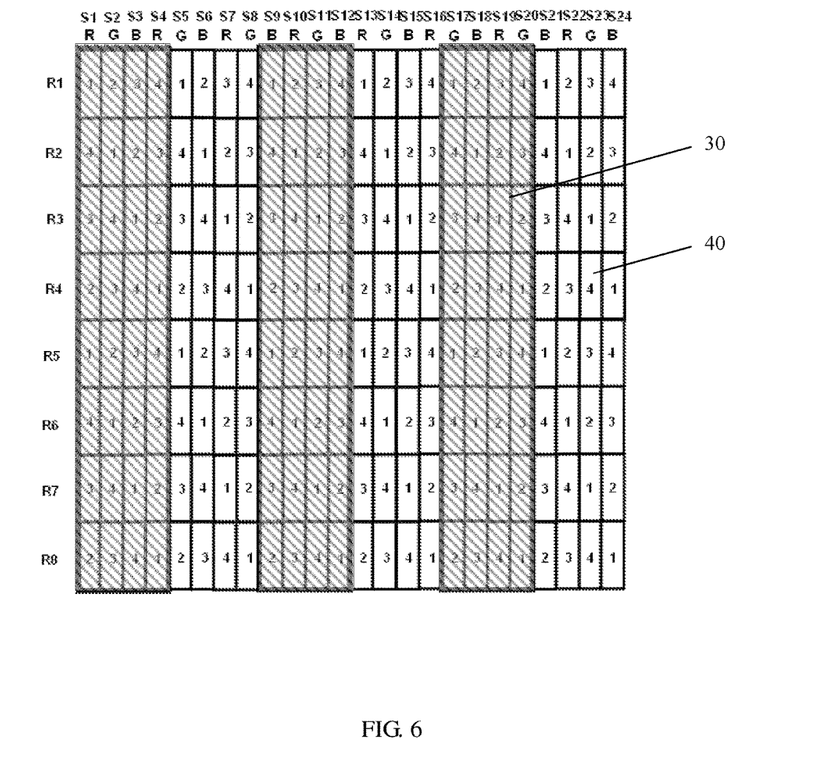
FIG. 6 shows another schematic view of the distribution of the grating array in FIG. 3.

FIG. 6 is a schematic view further showing another possible distribution of the grating array, wherein the respective light blocking strips of the grating array are arranged in the light outgoing direction of odd-group sub-pixels (the sub-pixels of S1th-54th, S9th-S12th, S17th-S20th columns, every four columns of adjacent sub-pixels being arranged in a group), and each of the light blocking strips blocks four columns of adjacent sub-pixels. Of course, in actual application, the grating array herein may also be arranged in the light outgoing direction of the even-group sub-pixels (sub-pixels of the S5th-S8 th, S13th-S16th, S21th-S24th columns).

Figure 7:
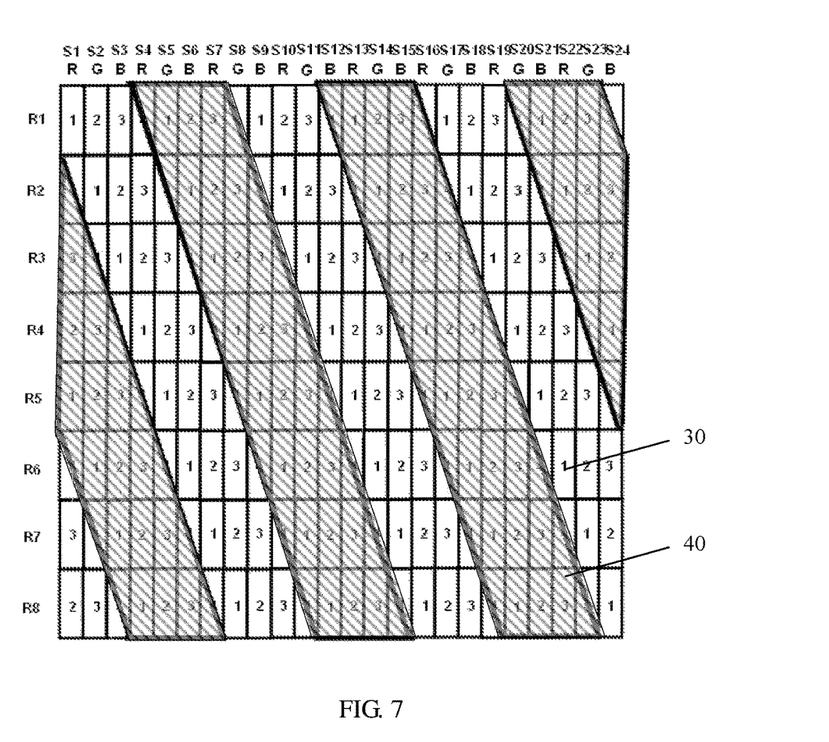
FIG. 7 shows another schematic view of the distribution of the grating array in FIG. 3.

FIG. 7 is a schematic view further showing another possible distribution of the grating array, wherein each of the light blocking strips of the grating array is a parallelogram. The projection of short sides of the parallelogram on the pixel array is in the row direction and occupies four columns of adjacent sub-pixels and the projection of long sides thereof on the pixel array diagonally bisects the sub-pixels in the fourth view pixel group. Of course, in actual application, for the blocking strip herein as a parallelogram, the projection of its long sides on the pixel array can also bisect the sub-pixels of the other view pixel groups than the fourth view pixel group 4. Under the premise that the 3D display can be realized, the corresponding technical solution should also fall within the scope of the present invention.

According to a second aspect of the present invention, there is also provided a display driving method operable to drive the display panel, the method comprising:

in step S1, dividing each view of the first view, the second view, the third view and the fourth view to be displayed into a plurality of theoretical pixel units and determining color components of a plurality of rectangular sub-pixels in each of the theoretical pixel units;

in step S2, determining, for each rectangular sub-pixel, the luminous brightness of the rectangular sub-pixel according to color components of colors of the rectangular sub-pixel covered by a rectangular sampling region corresponding to the rectangular sub-pixel and belonging to the respective theoretical pixel units of the corresponding view;

wherein, a first vertex of a rectangular sampling region of a rectangular sub-pixel is located at a first side of a first end vertex of a first side of the rectangular sub-pixel and the distance to the first end vertex of the first side of the rectangular sub-pixel is four times the width of the rectangular sub-pixel in the row direction; a second vertex is located on an extended line of a diagonal line from the first end vertex of the first side of the rectangular sub-pixel to a second end vertex of a second side, and the distance to the midpoint of the diagonal line is 3/2 times the length of the diagonal line; the third vertex and the first vertex are symmetrical with respect to the midpoint of the diagonal line, the fourth vertex and the second vertex are symmetrical with respect to the midpoint of the diagonal line; wherein the number of columns is gradually increased along the direction from the first side to the second side, and the number of rows is gradually increased along the direction from the first end to the second end. It is not difficult for those skilled in the art to think of the direction from the first side to the second side, and the direction from the first end to the second end, are not limited thereto.

Using the display driving method provided by the present invention, over-sampling and incomplete sampling of the display region can be avoided, and the display effect can be improved.

Specifically, step S2 here may specifically mean: determining, for each rectangular sub-pixel, an overlapping area of its corresponding rectangular sampling region with each theoretical pixel unit and a color component corresponding to the color of the rectangular sub-pixel in the theoretical pixel unit; determining, the product of the overlapping area corresponding to each theoretical pixel unit and the corresponding color component; determining the luminous brightness of the rectangular sub-pixel according to the ratio of the sum of the respective obtained products to the area of the rectangular sub-pixel. Of course, in practical applications, after the rectangular sampling region is used for sampling, the luminous intensity of the corresponding sub-pixel can also be determined in other ways. There is no further detailed description thereof in the embodiments of the present invention.

The display driving method provided by the present invention will be further described below. For convenience of description, a sampling region corresponding to each sub-pixel of the first view will be described as an example.

Figure 8:
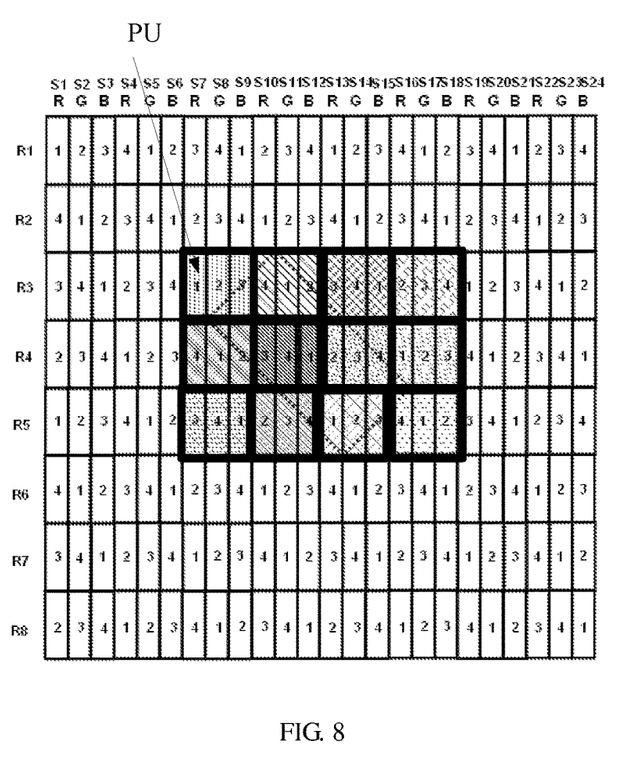
FIG. 8 shows a rectangular sampling region of blue sub-pixels at the $R4_{th}$-row and the $S12_{th}$ column.

As shown in FIG. 8, for the blue sub-pixel B at the R4th row and the S12th column, the corresponding rectangular sampling region may be as shown by the dashed box in FIG. 8, the first vertex (leftmost vertex located at the left upper vertex of the sub-pixel at the R4th row and the S8th column) of the rectangular sampling region is located at the width of four sub-pixels on the left side of the left upper vertex of the blue sub-pixel B; the second vertex (upmost vertex located at the left upper vertex of the R3th row and S11th column) of the rectangular sampling region is located on the extended line of the diagonal line between the left upper vertex and the right lower vertex of the blue sub-pixel B, and the distance to the midpoint of the diagonal line of the blue sub-pixel B is 3/2 times the length of the diagonal line; the third vertex (rightmost vertex located at the right lower vertex of the sub-pixel at the R4th row and the S16th column) of the rectangular sampling region is located at the width of four sub-pixels on the right side of the right lower vertex of the blue sub-pixel B; and the fourth vertex (lowest vertex located at the right lower vertex of the R5th row and the S13th column) of the rectangular sampling region is located on the extended line of the diagonal line from the left upper vertex and the right lower vertex of the blue sub-pixel B, is distant from the midpoint of the diagonal line of the blue sub-pixel B by 3/2 times the length of the diagonal line, and is symmetric with the second vertex with respect to the midpoint of the diagonal line of the blue sub-pixel B.

As shown in FIG. 8, assuming that a theoretical pixel unit PU in the embodiment of the present invention comprises three sub-pixels adjacent in the row direction, the rectangular sampling region of the blue sub-pixel B at the R4th row and S12th column overlaps the regions corresponding to 10 theoretical pixel units. In the specific implementation, the product of the overlapping area corresponding to each theoretical pixel unit in the ten theoretical sub-pixel units and the blue component in this theoretical pixel unit can be calculated, the sum of the respective products is divided by the area of one sub-pixel, and the luminous brightness of the blue sub-pixel B is determined according to the obtained ratio.

Figure 9:
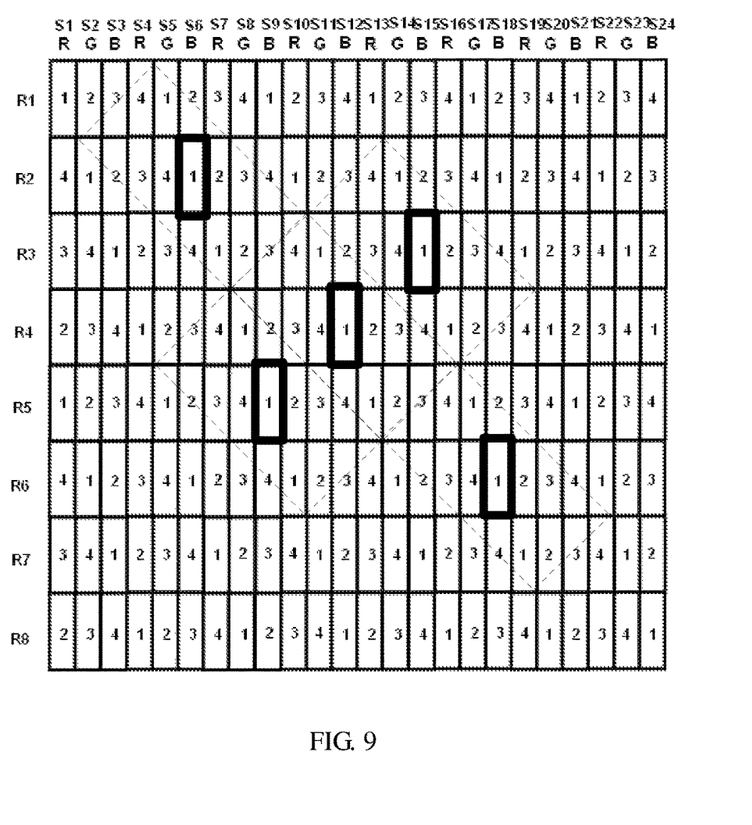
FIG. 9 shows a rectangular sample region of blue sub-pixels at $R4_{th}$ row and $S12_{th}$ column, $R3_{th}$ row and $S15_{th}$ column, $R5_{th}$ row and $S9_{th}$ column, $R2_{th}$ row and $S6_{th}$ column, $R6_{th}$ row and $S18_{th}$ column.

FIG. 9 also shows a rectangular sample region of blue sub-pixels B likewise belonging to the first view pixel group 1 at the R3th row and the S15th column, the R5th row and the S9th column, the R2th Row and the S6th column, the R6th row and S18th column adjacent to the blue sub-pixel B at the R4th row and the S12th column. It can be seen from FIG. 9 that for any blue sub-pixel B, the first vertex of the corresponding rectangular sampling region is located at the width of four sub-pixels on the left side of the left upper vertex of the blue sub-pixel B; the second vertex of the rectangular sampling region is located on the extended line of the diagonal line between the left upper vertex and the right lower vertex of the blue sub-pixel B and the distance to the midpoint of the diagonal line is 3/2 times the length of the diagonal line; the third vertex and the first vertex are symmetrical with respect to the midpoint of the diagonal line, the fourth vertex and the second vertex are symmetrical with respect to the midpoint of the diagonal line. As it can be seen, in the embodiment of the present invention, the design of the sampling region enables full sampling of the entire display region without sampling overlapping.

Figure 10:
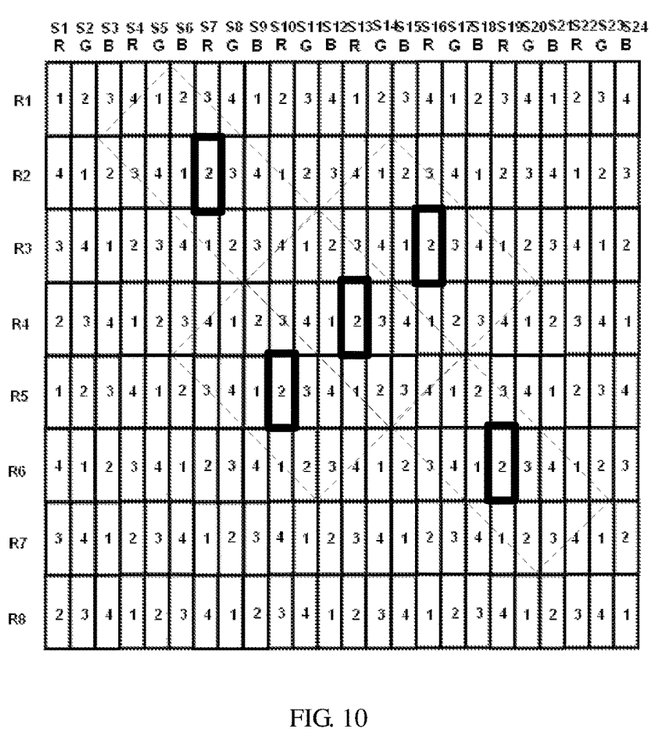
FIG. 10 shows a sampling region of a portion of red sub-pixels in a second view pixel group.
Figure 11:
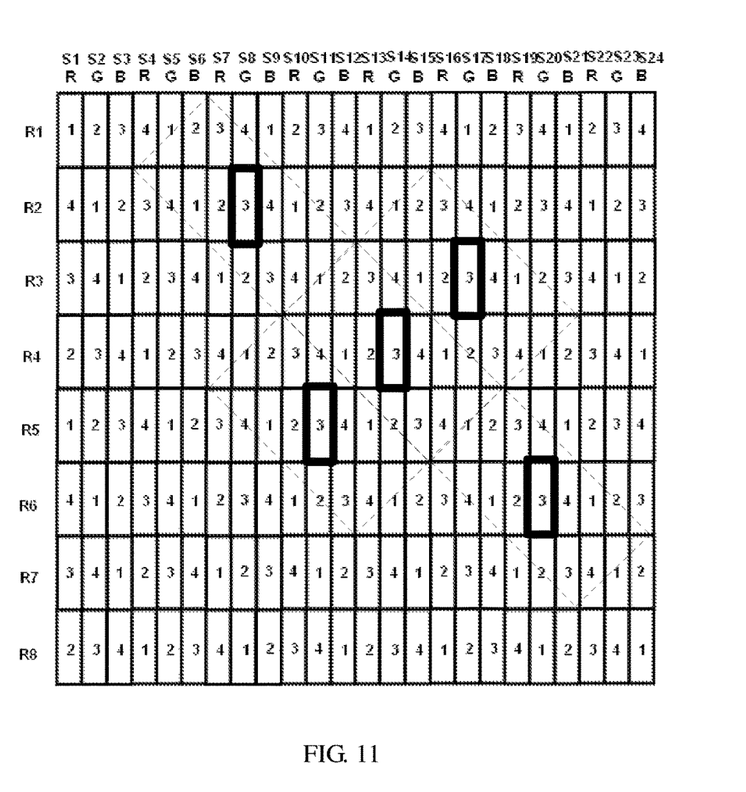
FIG. 11 shows a sampling region of a portion of green sub-pixels in a third view pixel group.
Figure 12:
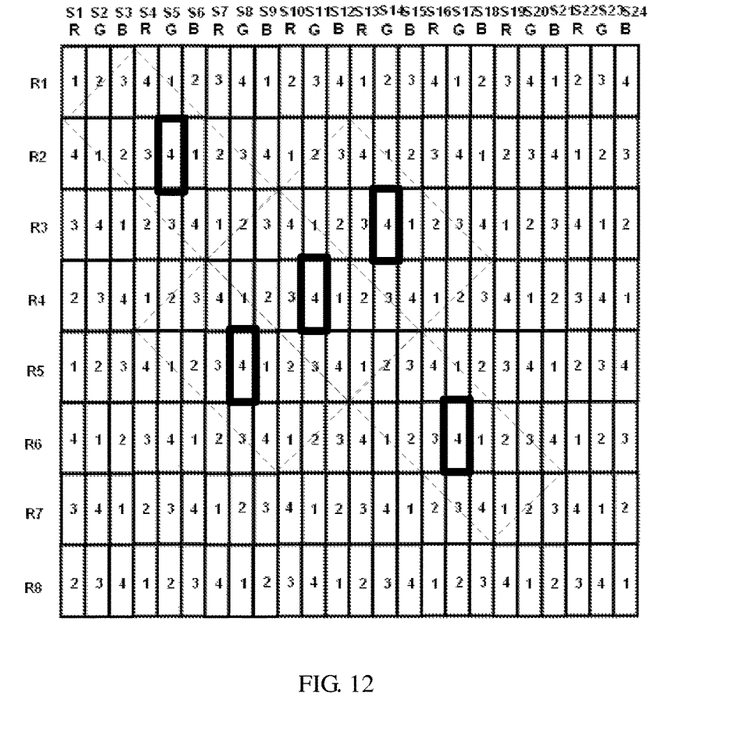
FIG. 12 shows a sampling region of a portion of green sub-pixels in a fourth view pixel group.

FIG. 10 shows a rectangular sampling region of a portion of red sub-pixels R in a second view pixel group 2; FIG. 11 shows a rectangular sampling region corresponding to a portion of green sub-pixels G in a third view pixel group 3; FIG. 12 shows a rectangular sampling region corresponding to a portion of green sub-pixels G in a fourth view pixel group 4. Same as the rectangular sampling regions in FIGS. 8 and 9, for the blue sub-pixel B of any of the corresponding view pixel groups in FIGS. 10-12, the first vertex of the corresponding rectangular sampling region is located at the width of four sub-pixels on the left side of the left upper vertex of the blue sub-pixel B; the second vertex of the rectangular sampling region is located on the extended line of the diagonal line between the left upper vertex and the right lower vertex of the blue sub-pixel B, and the distance to the midpoint of the diagonal line is 3/2 times the length of the diagonal line; the third vertex and the first vertex are symmetrical with respect to the midpoint of the diagonal line; the fourth vertex and the second vertex are symmetrical with respect to the midpoint of the diagonal line.

It should be understood that although the above description is made with respect to the rectangular sampling region of the blue sub-pixel B, the red sub-pixel R, the green sub-pixel G and the blue sub-pixel B are distributed in the same way, thus the shapes of the rectangular sampling regions of the red sub-pixel R and the green sub-pixel G as well as the positional relationships thereof with respect to the sub-pixels are the same as the shape of the rectangular sampling region of the blue sub-pixel B and the positional relationship of the rectangular sampling region of the blue sub-pixel B with respect to the blue sub-pixel B, and will not be described in detail herein.

It should be understood that although the above-described embodiments have been described in terms of sub-pixels of three colors, respectively, blue, green, and red, in the practical application, the above-mentioned sub-pixels of three colors may be other primary colors, such as cyan, magenta and yellow (CMY), which can be mixed to produce various colors, and will not be described here.

According to another aspect of the present invention, there is also provided a display driving device usable for the above-described display panel, the display driving device comprising:

a pixel dividing unit for dividing each of the first view, the second view, the third view and the fourth view to be displayed into a plurality of theoretical pixel units and determining color component of a plurality of rectangular sub-pixels in each of the theoretical pixel units;

a brightness determination unit for determining, for each rectangular sub-pixel, the luminous brightness of the rectangular sub-pixel according to color components of colors of the rectangular sub-pixel covered by a rectangular sampling region corresponding to the rectangular sub-pixel and belonging to the respective theoretical pixel units of the corresponding view;

wherein a first vertex of a rectangular sampling region of a rectangular sub-pixel is located at a first side of a first end vertex of a first side of the rectangular sub-pixel and the distance thereof to the first end vertex of the first side of the rectangular sub-pixel is four times the width of the rectangular sub-pixel in the row direction; a second vertex is located on an extended line of a diagonal line from the first end vertex of the first side of the rectangular sub-pixel to a second end vertex of a second side, and the distance thereof to the midpoint of the diagonal line is 3/2 times the length of the diagonal line; the third vertex and the first vertex are symmetrical with respect to the midpoint of the diagonal line, the fourth vertex and the second vertex are symmetrical with respect to the midpoint of the diagonal line; wherein the number of columns is gradually increased along the direction from the first side to the second side, and the number of rows is gradually increased along the direction from the first end to the second end. It is not difficult for those skilled in the art to think of the direction from the first side to the second side and the direction from the first end to the second end, are not limited thereto.

In the display driving device provided by the invention, the sampling region is designed so that the whole display region can be sampled completely without overlapping sampling, so as to avoid the problem of picture distortion caused by incomplete sampling or overlapping sampling.

Alternatively, the brightness determination unit is used for determining, for each rectangular sub-pixel, an overlapping area of its corresponding rectangular sampling region with each theoretical pixel unit and a color component corresponding to the color of the rectangular sub-pixel in the theoretical pixel unit;

determining, the product of the overlapping area corresponding to each theoretical pixel unit and the corresponding color component;

determining the luminous brightness of the rectangular sub-pixel according to the ratio of the sum of the respective obtained products to the area of the rectangular sub-pixel.

According to a fourth aspect of the present invention, there is also provided a display device comprising the display panel and the display driving device. The display device may be specifically a product having a display function like a mobile phone, a tablet computer, a PAD, a desktop computer, or a television.

The forgoing is merely about the specific embodiments of the present invention, but the scope of the present invention for protection is not limited thereto, and any change or substitution easily conceivable to those skilled in the art within the technical scope of the present invention, is intended to be included within the scope of the present invention for protection. Accordingly, the scope of protection of the present invention should be determined by the scope of protection of the claims.

What is claimed is:

1. A display panel comprising:
   a pixel array; and
   a grating array arranged in a light outgoing direction of the pixel array, the grating array including one or more light blocking strips;
   wherein the pixel array is periodically arranged in order of a first color sub-pixel column, a second color sub-pixel column and a third color sub-pixel column, each sub-pixel column comprising a plurality of rectangular sub-pixels;
   wherein the pixel array comprises a first view pixel group for displaying a first view, a second view pixel group for displaying a second view, a third view pixel group for displaying a third view, and a fourth view pixel group for displaying a fourth view;
   wherein, for any positive integer M and any integers X and Y equal to or greater than zero, the sub-pixel at the (M+4X)th Row and the (M+4Y)th Column belongs to the first view pixel group, the sub-pixel at the (M+1+4X)th Row and the (M+4Y)th Column belongs to the fourth view pixel group, the sub-pixel at the (M+2+4X)th Row and the (M+4Y)th Column belongs to the third view pixel group, and the sub-pixel at the (M+3+4X)th Row and the (M+4Y)th Column belongs to the second view pixel group; and
   wherein each of the light blocking strips of the grating array is a parallelogram, a projection of short sides of the parallelogram on the pixel array is in a row direction and occupies four columns of adjacent sub-pixels, and a projection of long sides of the parallelogram on the pixel array diagonally bisects the sub-pixels in one of the first view pixel group to the fourth view pixel group.

2. A display driving method for driving the display panel according to claim 1, comprising:
   dividing each view of the first view, the second view, the third view and the fourth view to be displayed into a plurality of theoretical pixel units and determining color components of a plurality of rectangular sub-pixels in each of the theoretical pixel units; and
   determining, for each rectangular sub-pixel, a luminous brightness of the rectangular sub-pixel according to the color component of color of the rectangular sub-pixel covered by a rectangular sampling region corresponding to the rectangular sub-pixel and belonging to the respective theoretical pixel units of the corresponding view;
   wherein a first vertex of a rectangular sampling region of a rectangular sub-pixel is located at a first side of a first end vertex of a first side of the rectangular sub-pixel, and a distance between the first vertex and the first end vertex of the first side of the rectangular sub-pixel is four times a width of the rectangular sub-pixel in the row direction;
   wherein a second vertex is located on an extended line of a diagonal line from the first end vertex of the first side of the rectangular sub-pixel to a second end vertex of a second side, and a distance between the second vertex and a midpoint of the diagonal line is 3/2 times a length of the diagonal line; and
   wherein a third vertex and the first vertex are symmetrical with respect to the midpoint of the diagonal line, and a fourth vertex and the second vertex are symmetrical with respect to the midpoint of the diagonal line.

3. The method according to claim 2, wherein determining, for each rectangular sub-pixel, the luminous brightness of the rectangular sub-pixel according to the color component of color of the rectangular sub-pixel covered by a rectangular sampling region corresponding to the rectangular sub-pixel and belonging to the respective theoretical pixel units of the corresponding view, comprises:
- determining, for each rectangular sub-pixel, an overlapping area of its corresponding rectangular sampling region with each theoretical pixel unit and a color component corresponding to the color of the rectangular sub-pixel in the theoretical pixel unit;
- determining a product of the overlapping area corresponding to each theoretical pixel unit and the corresponding color component;
- determining the luminous brightness of the rectangular sub-pixel according to a ratio of a sum of the respective obtained products to an area of the rectangular sub-pixel.

4. The display driving method according to claim 2, wherein the grating array is arranged in the light outgoing direction of odd-row sub-pixels or even-row sub-pixels.

5. The display driving method according to claim 2, wherein the grating array is arranged in the light outgoing direction of odd-group sub-pixels or even-group sub-pixels, and each group of sub-pixels comprises four columns of adjacent sub-pixels.

6. A display driving device for driving the display panel according to claim 1, wherein the display driving device comprises:
- a pixel dividing unit for dividing each of the first view, the second view, the third view and the fourth view to be displayed into a plurality of theoretical pixel units and determining color components of a plurality of rectangular sub-pixels in each of the theoretical pixel units; and
- a brightness determination unit for determining, for each rectangular sub-pixel, a luminous brightness of the rectangular sub-pixel according to the color component of color of the rectangular sub-pixel covered by a rectangular sampling region corresponding to the rectangular sub-pixel and belonging to the respective theoretical pixel units of the corresponding view;
- wherein a first vertex of a rectangular sampling region of a rectangular sub-pixel is located at a first side of a first end vertex of a first side of the rectangular sub-pixel, and a distance between the first vertex and the first end vertex of the first side of the rectangular sub-pixel is four times a width of the rectangular sub-pixel in the row direction;
- wherein a second vertex is located on an extended line of a diagonal line from the first end vertex of the first side of the rectangular sub-pixel to a second end vertex of a second side, and a distance between the second vertex and the midpoint of the diagonal line is 3/2 times a length of the diagonal line; and
- wherein a third vertex and the first vertex are symmetrical with respect to the midpoint of the diagonal line, and a fourth vertex and the second vertex are symmetrical with respect to the midpoint of the diagonal line.

7. The display driving device according to claim 6, wherein the brightness determination unit is for:
- determining, for each rectangular sub-pixel, an overlapping area of its corresponding rectangular sampling region with each theoretical pixel unit and a color component corresponding to the color of the rectangular sub-pixel in the theoretical pixel unit;
- determining a product of the overlapping area corresponding to each theoretical pixel unit and the corresponding color component; and
- determining the luminous brightness of the rectangular sub-pixel according to a ratio of a sum of the respective obtained products to an area of the rectangular sub-pixel.

8. The display driving device according to claim 6, wherein the grating array is arranged in the light outgoing direction of odd-row sub-pixels or even-row sub-pixels.

9. The display driving device according to claim 6, wherein the grating array is arranged in the light outgoing direction of odd-group sub-pixels or even-group sub-pixels, and each group of sub-pixels comprises four columns of adjacent sub-pixels.

10. A display device comprising:
the display panel according to claim 1; and
a display driving device, wherein the display driving device comprises:
- a pixel dividing unit for dividing each of the first view, the second view, the third view and the fourth view to be displayed into a plurality of theoretical pixel units and determining color components of a plurality of rectangular sub-pixels in each of the theoretical pixel units; and
- a brightness determination unit for determining, for each rectangular sub-pixel, a luminous brightness of the rectangular sub-pixel according to the color component of color of the rectangular sub-pixel covered by a rectangular sampling region corresponding to the rectangular sub-pixel and belonging to the respective theoretical pixel units of the corresponding view;
- wherein a first vertex of a rectangular sampling region of a rectangular sub-pixel is located at a first side of a first end vertex of a first side of the rectangular sub-pixel, and a distance between the first vertex and the first end vertex of the first side of the rectangular sub-pixel is four times a width of the rectangular sub-pixel in the row direction;
- wherein a second vertex is located on an extended line of a diagonal line from the first end vertex of the first side of the rectangular sub-pixel to a second end vertex of a second side, and a distance between the second vertex and the midpoint of the diagonal line is 3/2 times a length of the diagonal line; and
- wherein a third vertex and the first vertex are symmetrical with respect to the midpoint of the diagonal line, and a fourth vertex and the second vertex are symmetrical with respect to the midpoint of the diagonal line.

11. The display device according to claim 10, wherein the brightness determination unit is for:
- determining, for each rectangular sub-pixel, an overlapping area of its corresponding rectangular sampling region with each theoretical pixel unit and a color component corresponding to the color of the rectangular sub-pixel in the theoretical pixel unit;
- determining a product of the overlapping area corresponding to each theoretical pixel unit and the corresponding color component; and
- determining the luminous brightness of the rectangular sub-pixel according to a ratio of a sum of the respective obtained products to an area of the rectangular sub-pixel.

12. The display device according to claim 10, wherein the grating array is arranged in the light outgoing direction of odd-row sub-pixels or even-row sub-pixels.

13. The display device according to claim 10, wherein the grating array is arranged in the light outgoing direction of odd-group sub-pixels or even-group sub-pixels, and each group of sub-pixels comprises four columns of adjacent sub-pixels.

\* \* \* \* \*